(12) United States Patent
Weston et al.

(10) Patent No.: US 7,477,901 B2
(45) Date of Patent: Jan. 13, 2009

(54) METHOD AND APPARATUS FOR MINIMIZING SETUP TIME FOR A MOBILE STATION

(75) Inventors: Thomas E. Weston, Chandler, AZ (US); Karl E. Miller, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 1618 days.

(21) Appl. No.: 10/107,617

(22) Filed: Mar. 27, 2002

(65) Prior Publication Data

US 2003/0186651 A1    Oct. 2, 2003

(51) Int. Cl.
    *H04M 11/00* (2006.01)
(52) U.S. Cl. ...................... 455/453; 370/229
(58) Field of Classification Search ................. 455/500, 455/67.11, 556.1, 3.04, 403, 411, 575, 453; 370/353, 229, 328; 709/249, 241
See application file for complete search history.

(56) References Cited

U.S. PATENT DOCUMENTS

| | | | |
|---|---|---|---|
| 5,761,193 A | 6/1998 | Derango et al. | |
| 6,275,493 B1 | 8/2001 | Morris et al. | |
| 6,442,615 B1 * | 8/2002 | Nordenstam et al. | 709/241 |
| 6,608,832 B2 * | 8/2003 | Forslow | 370/353 |
| 2002/0101836 A1 | 8/2002 | Dorenbosch | |

* cited by examiner

*Primary Examiner*—Yuwen Pan

(57) ABSTRACT

A mobile station (10) is coupled to an external network (60) or to a media gateway (50). A network resource allocation manager (130) pre-establishes a communication network (100) connection of network nodes (20-50). This plurality of communication nodes is assigned (150) as a complete unit instead of piecemeal sequentially. Based upon communication network node resources and network operator input, a number of the communication nodes or speculative contexts are pre-established (148).

14 Claims, 2 Drawing Sheets

METHOD AND APPARATUS FOR MINIMIZING SETUP TIME FOR A MOBILE STATION

BACKGROUND OF THE INVENTION

The present invention pertains to telecommunication network access by a mobile subscriber and more particularly to a method and apparatus for minimizing the setup time for a mobile station interconnection to an external network.

Currently, there is an emphasis on access to various external networks by a mobile station of a mobile subscriber. In order for a mobile station to access an external network such as the Internet, many connections or links must be made from the mobile station through communication networks to the external network. Each of these links means connecting network equipment or networks to one another. Handshaking is commonplace in such setups. Each connection of equipment is a sequential connection from one network node to the next. Setup times to make the required connection can range up to ten seconds or longer.

Setup time depends on a number of variables, among them are network traffic and accessibility to various network equipment. A packet data protocol (PDP) context setup is a significant portion of the session initiation for a particular mobile station to reach an external network. First, a radio access network (RAN) must assign a radio access bearer (RAB) to the mobile station. The radio access bearer is essentially a radio bearer channel, which is set up for each mobile station request for service. Second, the radio access network links to a serving GPRS support node (SGSN). Next, the SGSN further links to a gateway GPRS support node (GGSN). Finally a link is established between the GGSN and a border gateway (BGW) or media gateway (MGW). If the data session terminates to a destination point on the external network, then the final link establishments continue, but outside the realm of the communications network. If the session terminates to a local applications service provided by the media gateway (MGW), then the link establishment procedure is complete for this session. This serial linking of network events takes a long time as seen by the subscriber of the mobile station.

Accordingly, it would be highly desirable to have an expedited packet data protocol context setup through a network to an external network such as the Internet. As a result subscriber satisfaction will be greatly increased.

DESCRIPTION OF THE PREFERRED EMBODIMENT OF THE INVENTION

Figure 1:
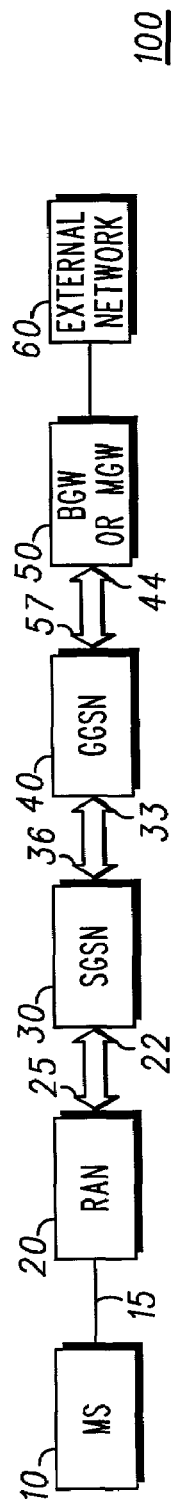
FIG. 1 is a block diagram of various nodes of a communications system according to the present invention.

Referring to FIG. 1, a block diagram depicting the various nodes of telecommunication network is shown. Mobile station (MS) 10 typically requests communication via radio access network (RAN) 20. This action is termed a session invite. A mobile subscriber, not shown, operates mobile station 10. This session invite is forwarded by each network node or element based upon its addressing. As an example, a stamped and addressed party invitation works its way through the postal network or system in a similar fashion. Each distribution point or node forwards the letter or in this case session invite to the next distribution point or node on its way to the destination address. The purpose of the session invite is to determine whether the destination entity is available.

In response to the mobile station 10 invitation, radio access network assigns a radio access bearer (RAB) 15 to facilitate the transmission of data. Since mobile station 10 desires data services, the request generated is a packet data protocol (PDP) request for a data link and corresponding data services.

RAN 20 establishes a link 22 with serving GPRS support node 30, checks its resource pool and assigns a radio resource to mobile station 10. SGSN 30 requests the radio access network to supply the appropriate resources to mobile station 10. Radio access network 20 supplies a suitable radio access bearer or communication channel 15. SGSN 30 is responsible for maintaining the resources and the link for the wireless portion of the data communications between mobile station 10 and the communication system 100. SGSN 30 maintains the wireless link to MS 10 and manages the mobility aspects of mobile station 10.

SGSN 30 then forwards the request for a link to gateway GPRS serving node (gateway GPRS support node) 40 via link 33. GGSN 40 is responsible for maintaining the resources and link for the wired portion of the communications network. Then, based upon the destination, GGSN 40 selects a border gateway or media server gateway 50 via link 44. Border gateway 50 will set up the appropriate connection or link with the appropriate external network 60 such as the Internet or voice mail or electronic media. Media gateway 50 will setup the appropriate connection or link with the local media application such as a paging service or a video-on-demand service.

Border or media server gateway 50 then responds with an Internet protocol (IP) route via link 57 to GGSN 40. GGSN 40 and SGSN 30 then establish link 36, which is a GTP tunneling protocol that establishes a data connection or PDP context request as specified by mobile station 10. SGSN 30 then establishes the generic tunneling protocol (GTP) link 25 with RAN 20. SGSN 30 then sends the PDP context response to RAN 20. There is now a data tunnel established between SGSN 30 and GGSN 40.

Next a PDP context response is sent from RAN 20 via RAB 15 to mobile station 10. At this point, there is a data session where a context is established from mobile station 10 all the way through to the border gateway or media gateway 50.

In the preferred embodiment of the invention each of the links connecting the network nodes are preset or pre-established. A number of links or network connections may be so established and pooled for use as required by the network. In other words, prior to mobile station 10's request, a connection will exist from RAN via link 22 into SGSN 30, from SGSN via link 33 to GGSN 40, and outbound from GGSN 40 via link 44 to another gateway; and inbound via link 57 to GGSN 40, via link 36 to SGSN 30 and outbound via link 25 to RAN. All these nodes and links will be pre-established. When a session invite request is received from mobile station 10, the connection will be immediately made from RAN 20 to SGSN 30 via links 22 and 25 then to border gateway or media gateway 50 via links 44 and 57. As a result, a 50% reduction in the communication setup time may be achieved by this pre-establishment of network nodes method.

These pre-established network node configurations may be termed a speculative context. That is, these are contexts, which are set up speculatively and intelligently for future use when an appropriate session invite is received by the communication network 100.

Figure 2:
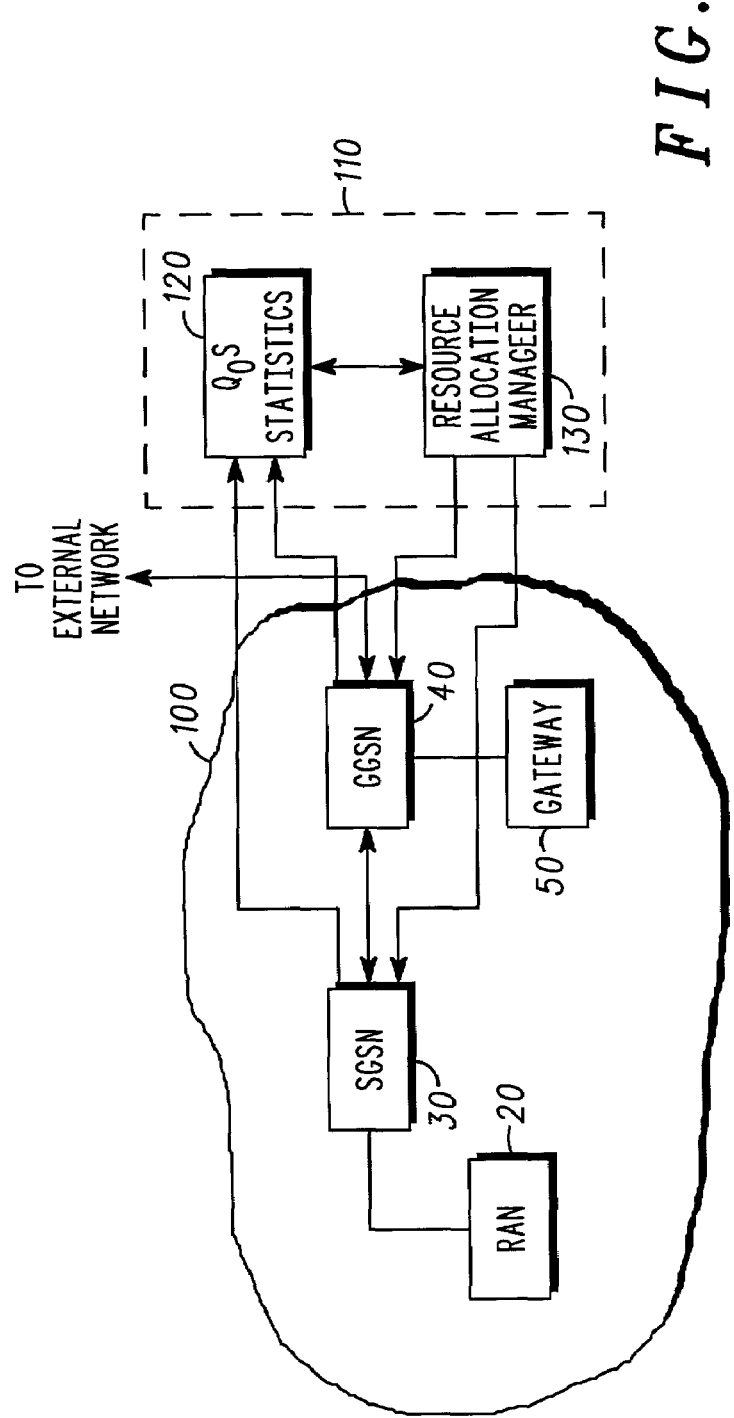
FIG. 2 is a block diagram of a speculative context arrangement according to the present invention.

Now turning to FIG. 2, a block diagram of a speculative context arrangement is shown. Speculative context manager 110 includes quality of service statistics collection function 120 and resource allocation manager 130. Quality of service statistics function 120 is coupled to network nodes 20, 30, 40 and 50 and to links 22, 25, 33, 36, 44 and 57, for example. From these connections statistics are drawn based upon mobile subscriber histories, current status, quality of service contexts, service availability, available network capacity, most likely quality of service class, and most probable data rate, for example. These statistics are stored and managed by manager 110. Resource allocation manager 130 then directs the various network nodes to pre-establish one or more speculative context interconnections of network nodes.

A number of interconnections from node 20 to node 50 may be established within communication network 100. The resources may be pooled so that there are speculative contexts to various internal and other external networks.

Figure 3:
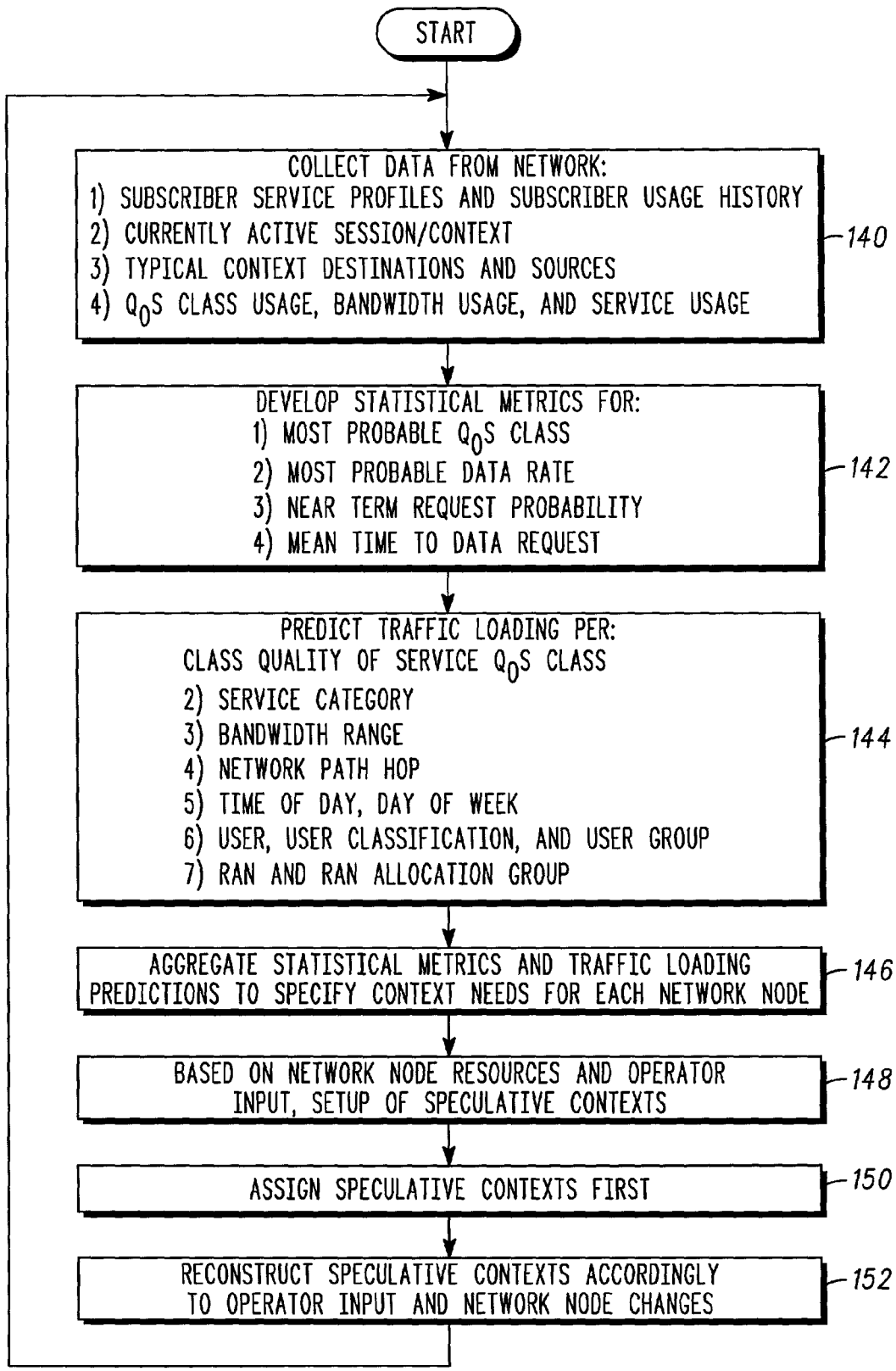
FIG. 3 is a flow chart of the speculative context arrangement according to the present invention.

Referring to FIG. 3, a method for speculative context setup is shown. This context is pre-established through the network. Many such contexts may be established and pooled to more quickly link a mobile subscriber to its destination address. Resource manager 110 as shown in FIG. 2 performs the method described in FIG. 3. Quality of service statistics are input to the resource manager from collection function 120.

The method for assigning speculative context 200 is initiated at block 140. Block 140 collects data from the network. This function is performed by the quality of service statistics function 120 as shown in FIG. 2. Each of the network nodes 20, 30, 40 and 50 for example, provides input features and data to the quality of service statistics function 120. The information collected by statistics function 120 includes subscriber service and profiles, subscriber usage history, currently active sessions and contexts, typical context destinations and sources, and quality of service class usage, bandwidth usage and service usage.

Next, block 142 develops statistical metrics. These statistical metrics are developed for: 1) a most probable quality of service class; 2) a most probable data rate; 3) a near term request probability; and 4) a mean time to the next data request. These statistical metrics are collected by quality of service statistic function 120.

These statistics and data from the network of blocks 142 and 140 respectively are transmitted to resource allocation manager 130. Resource allocation manager 130 next uses the statistical metrics and network data to predict traffic loading, block 144. Traffic loading is predicted for: 1) each quality of service class; 2) each service category; 3) each bandwidth range; 4) each network path hop (interconnection or link between each network node); 5) the time of day and the day of the week; 6) each mobile station or mobile subscriber, each mobile station classification and each mobile station group; and 7) each radio access network and each radio access network allocation group. These predictions may be based upon prior usage as collected by statistics function 120. These predictions may be as basic as simply counting the number of times a particular bandwidth or data rate is chosen and predicting that as the most likely to be used thereafter, block 144. In addition, more complex models based upon statistical analysis may also be used.

Then block 146 aggregates the statistical metrics and the traffic loading predictions. As a result of the aggregation or adding of the metrics and traffic loading predictions, the method is able to specify the context needs for each network node. That is, the resource allocation manager 130 is able to specify how many of each type pre-established connections would typically be required for current communication network operations. The number of connections from RAN through SGSN, through GGSN to both the media gateway and border gateways are then established.

As an example, if between the times of 3:00 and 4:00 pm on given weekdays and a mean or average number of external network session invites was 10, then a quantity of 10 pre-established context connections might be established. These PDP context connections would include links out of the RAN, through the SGSN, through GGSN and into a second gateway (both border gateway and media gateway). When the communication network 100 received a request from a mobile station 10 for example, the applicable pre-linked speculative context from RAN to either BGW or MGW is immediately assigned to the particular mobile station 10 request. As a result, only the links from the MS to the RAN and from the border gateway to the external network would be required to be made. This would save approximately 50% of the setup time or more required for a session initiation request to either an external network or a local media application by a mobile station.

Network operator input on the amount of pre-established speculative contexts is input to block 148. This, for example, would include the number of network elements RANs, SGSNs, GGSNs and border or media gateways. It would also include a not to exceed number for the number of pre-established speculative contexts that the resource allocation manager 130 should or could set up. Based upon these inputs, resource allocation manager 130 sets up an appropriate number of speculative contexts, block 148.

When communication network 100 receives session invite requests from a mobile station to external networks, which have associated with it a speculative context, that speculative context will be assigned to that request first, block 150. That is, speculative contexts will be assigned first to requests before individual network nodes are connected in the above-mentioned sequential fashion. Accordingly, the great majority of session initiation requests will receive speculative contexts, which are pre-setup according to the number, and type of speculative contexts that the network resource allocation manager 130 believes is an appropriate type and number. Only after all the speculative contexts are in use will individual network nodes be connected in a sequential fashion.

Lastly, block 152 will reconstruct speculative contexts according to network operator input and to network node changes. That is, if more network nodes have been added or network nodes have been eliminated, then the number of speculative contexts will be increased or decreased accordingly. Based on any changes made in block 152, the method 200 will be iterated to use current network data and statistical metrics to adjust the number of speculative context periodically.

As can be appreciated from the above description, speculative PDP contexts are pre-established by the network. Once these contexts have been pre-established they are assigned first to requesting stations. As a result, the requesting station sees a setup time reduction of at least 50%. Currently, stations are subject to a 10 second or greater call setup time. With the applicability of the present invention, this time would be cut in half or less. Further, since network nodes have been optimized, the stations will also feel a slight increase in network capacity for data services. The present invention also includes statistical analysis for intelligently pre-establishing network node interconnections. This intelligent setup is dynamic in that it is constantly changing according to network operator input and network node availability. The present invention may receive widespread use in GPRS systems, UMTS systems and CDMA systems.

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. A method for coupling a plurality of mobile stations from a communication network to an external network comprising the steps of:
    collecting aggregate data regarding prior connections between the communication network and the external network;
    predicting future traffic loading between the communications network and the external network based upon the collected aggregate data;
    pre-establishing a plurality of speculative context links between the communications network and the external network based upon the predicted future traffic loading; and
    dynamically assigning the plurality of speculative context links as the requests for connections are received from the plurality of mobile stations to thereby establish a connection between the plurality of mobile stations and the external network.

2. The method for coupling a mobile station as claimed in claim 1, wherein the step of dynamically assigning includes the step of:
    setting up the plurality of communication links based upon a plurality of communication network nodes and a network operator input.

3. The method for coupling a mobile station as claimed in claim 2, further comprising the step of reconstructing the number of pre-established communication links according to changes in the plurality of communication network nodes and to the network operator input.

4. The method for coupling a mobile station as claimed in claim 1, wherein the step of collecting aggregate data comprises collecting at least one of:
    a) subscriber service profiles and subscriber usage history;
    b) current active sessions and contexts;
    c) context destinations and sources; and
    d) quality of service class usage, bandwidth usage and service usage.

5. The method for coupling a mobile station as claimed in claim 1, wherein there is further included a step of developing statistics from the collected aggregate data, the statistics including at least one of:
    a) a most probable quality of service class;
    b) most probable data rate;
    c) a near term request probability; and
    d) a mean time to data request.

6. The method for coupling a mobile station as claimed in claim 1, wherein the step of predicting future traffic loading comprises determining at least one of:
    a) quality of service class;
    b) service category;
    c) bandwidth range;
    d) network path hop;
    e) time of day and day of week;
    f) station and station classification and station group; and
    g) radio access network and radio access network allocation group.

7. The method for coupling a mobile station as claimed in claim 1, wherein there is further included the step of:
    specifying a number of pre-established communication links in the plurality of communication links.

8. The method for coupling a mobile station as claimed in claim 1, wherein the step of pre-establishing includes the step of coupling a radio access network to a serving GPRS support node.

9. The method for coupling a mobile station as claimed in claim 8, wherein there is further included the step of coupling the serving GPRS support node to a gateway GPRS support node.

10. The method for coupling a mobile station as claimed in claim 9, wherein there is further included the step of coupling the gateway GPRS support node to a border gateway for coupling to the external network.

11. The method for coupling a mobile station as claimed in claim 9, wherein there is further included the step of after a session invite request, coupling the mobile station via a radio access network.

12. The method for coupling a mobile station as claimed in claim 9, wherein there is further included the step of after a session invite request, coupling the gateway GPRS support node via a media server gateway for coupling to the external network.

13. An apparatus for coupling a plurality of mobile stations to an external network comprising:
    a radio access network configured to receive requests for data services from the plurality of mobile stations;
    a plurality of communication network nodes in communication with the radio access network and configured for coupling to the external network; and
    a resource allocation manager coupled to at least some of the plurality of communication network nodes, wherein the resource allocation manager is configured to collect aggregate data regarding prior connection between the plurality of communications network nodes and the external network, to predict future traffic loading between the plurality of communications network nodes and the external network based upon the collected aggregate data, to pre-establish a plurality of speculative context links between the plurality of communications network nodes and the external network based upon the predicted future traffic loading, and to dynamically assign the plurality of speculative context links as requests for data services are received from the plurality of mobile stations to thereby establish connections between the plurality of mobile stations and the external network.

14. The apparatus for coupling a plurality of mobile stations as claimed in claim 13, wherein the aggregate data comprises at least one of:
    a) subscriber service profiles and subscriber usage history;
    b) current active sessions and contexts;
    c) context destinations and sources; and
    d) quality of service class usage and bandwidth usage and service usage.

* * * * *